United States Patent [19]
Planke

[11] 3,955,179
[45] May 4, 1976

[54] APPARATUS FOR AUTOMATIC PATTERN RECOGNITION AND REGISTRATION OF EMPTY BOTTLES

[76] Inventor: Tore Planke, Nykirke, Norway

[22] Filed: Oct. 11, 1974

[21] Appl. No.: 514,036

Related U.S. Application Data

[63] Continuation-in-part of Ser. No. 438,968, Feb. 4, 1974, which is a continuation-in-part of Ser. No. 308,244, Nov. 20, 1972, abandoned.

[30] Foreign Application Priority Data

Dec. 14, 1971 Norway.............................. 4613/71

[52] U.S. Cl.......................... 340/146.3 H; 209/80; 209/111.5; 235/92 PK; 250/223 B; 356/240
[51] Int. Cl.²......................................... G06M 7/00
[58] Field of Search................. 250/223 B; 356/240; 198/22 B, 40; 209/80, 111.5; 235/92 PK, 92 V, 92 DM, 92 CP; 340/146.3 H

[56] References Cited
UNITED STATES PATENTS

| | | | |
|---|---|---|---|
| 3,159,749 | 12/1964 | Dalrymple et al. ............. | 235/92 PK |
| 3,257,897 | 6/1966 | Schneider........................ | 250/223 B |
| 3,358,552 | 12/1967 | Schneider........................ | 250/223 B |
| 3,365,699 | 1/1968 | Foster .............................. | 250/223 B |
| 3,529,169 | 9/1970 | Heaney et al. .................. | 250/223 B |
| 3,665,444 | 5/1972 | Scott ............................... | 250/223 B |

*Primary Examiner*—Leo H. Boudreau
*Attorney, Agent, or Firm*—Nolte and Nolte

[57] ABSTRACT

An apparatus for automatic recognition and registration of bottles includes detectors positioned to detect a light pattern from bottles passing a sensing stage. The outputs of the sensors are detected and converted to unique output signals for application to a computer and registration circuit. The computer circuit is preprogrammed to provide an output corresponding to the value of a given bottle passing through the sensing stage. The output of the computer is applied to a printing system for enabling a printer output corresponding to the value assigned to a series of bottles registered by the apparatus.

20 Claims, 15 Drawing Figures

APPARATUS FOR AUTOMATIC PATTERN RECOGNITION AND REGISTRATION OF EMPTY BOTTLES

This is a continuation-in-part of application Ser. No. 438,968, filed Feb. 4, 1974, which was a continuation-in-part of application Ser. No. 308,224, filed Nov. 20, 1972 and now abandoned.

The invention relates to an apparatus for automatic pattern recognition and registration of empty bottles, which by a preferentially motor-driven transporting means are transported past an optical device consisting of a light source and a photo-electric sensing unit.

The invention is useful, for example, in grocery stores where manual counting of empty bottles, hereinafter also named empties, having different values of deposit is both time-consuming and unreliable. Continual errors in the counting of bottles result in the return of empties becoming a losing business for the grocer, as well as requiring unnecessary customer-service time. The return of empties is a real problem in larger stores such as supermarkets.

In the past, various devices have been known for the registration of bottles and for use in grocery stores. The most common type provides a different section of each bottle-type. The customer chooses the right hole, puts the bottles into the hole and pulls down a handle pressing the bottle inwardly in the apparatus. When all the bottles of the same type have been inserted in the apparatus, another handle is pressed down and a slip of paper appears having a number of punched holes corresponding to the number of bottles which were inserted into the hole. There is different color for the different deposit values. The holes are then counted at the cash desk and multiplied by the deposit value.

Another known registration apparatus works along the same principle, but with the difference that the registration slip is replaced by balls, whose number and color correspond to the number of bottles and matching deposit value.

The great disadvantage of these devices is that manual counting still must be performed, either of punched holes or of balls, and that the total sum for each class of deposit values must be calculated.

It is also known per se to have registration devices which, for example, register the number of bottles being transported past an optical device, and where information about the number of bottles may be printed on a list. However, such devices cannot differentiate types of bottles and are thus solely used for counting the number of units having passed the optical device.

The invention overcomes the above disadvantages in that bottles of different size and deposit value are registered automatically in the apparatus and that the customer automatically is given a calculated receipt for the sum of deposits to be collected at the cash desk.

The apparatus, according to the invention, comprises a registration device which by means of shadow-images of the bottles registers the number and dimensions, for example, height, of the bottles which pass the optical device, the shadow-images being produced by the light source, and an electronic central unit which on the basis of the registered data operates a printer for print-out of wanted data about the bottles.

The optical device uses sharp shadow-images for the detection and the light source directs parallel light towards the photo-electric sensing unit consisting, for example, of several photo-transistors. The electronic central unit consists, according to the invention, of a signal converter, a detector, a computer and registration unit, a programming unit, a printer control and a control unit. The signal converter and detector convert the data from the optical sensing unit and logically sort these registered data. The programmable computer and registration unit adds and stores data with certain characteristics and data without fixed characteristics are rejected. The printer control controls the printer, which prints a registration result. The control unit administers and controls the complete apparatus, including monitoring and control of vital functions in the apparatus.

According to the invention, the photo-cell detectors are adjustable in position by suitable means, for example, magnets or the like, thereby making possible the registration of bottles of unusual type or fine adjustments of the sensing unit. The transporting means and the ejector mechanism have separate driving motors whose speeds are adapted to the respective functions. The control panel comprises start and stop (receipt) devices known per se, as well as two counters for the total registration of bottles and refund value respectively. The ejector mechanism is made with two rollers of elastic material known per se, whose surfaces are frictional. The rollers turn about their respective vertical axes at a certain minimum distance from each other, and with the opposite faces turning in the direction of movement of the transporting means.

In accordance with a further embodiment of the invention, the apparatus incorporates means for recognizing the characteristics of bottles in cartons, and for this purpose a light source for detecting the bottles in cartons is positioned to direct parallel light at an angle to the direction of movement of the cartons, whereby bottles placed side by side in a carton can be individually registered.

The apparatus shall now be further described with reference to the drawings in which.

Figure 1:
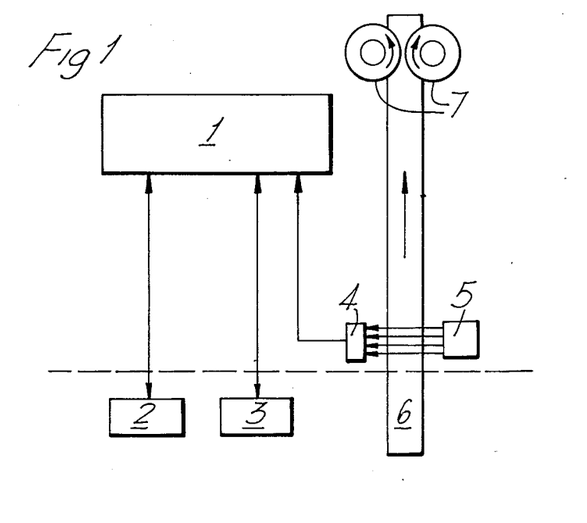
FIG. 1 is a block diagram of the apparatus according to the invention.
Figure 7:
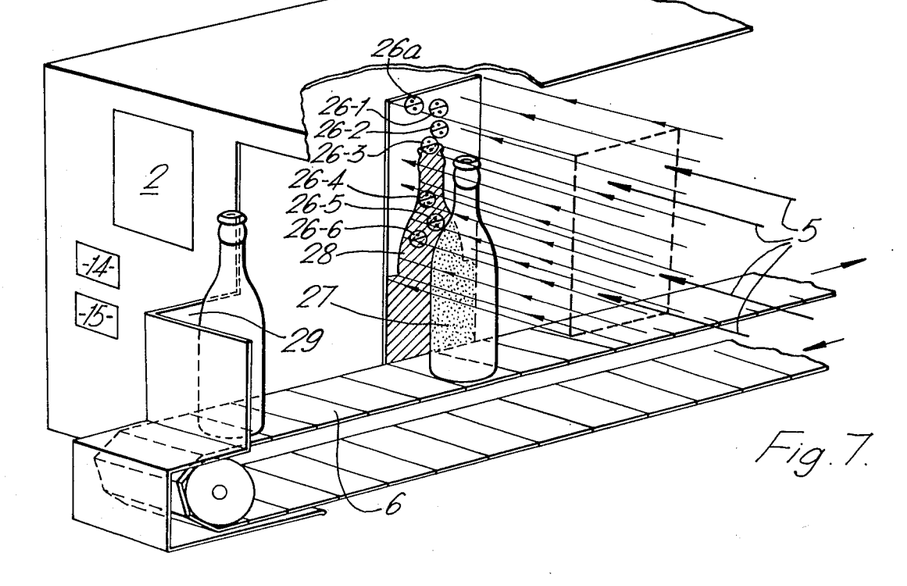
FIG. 7 shows a part of the apparatus in a part-sectional view to illustrate the optical device and the transporting arrangement.

Referring now to the drawings, FIGS. 1 and 7 illustrate a transporting means 6, such as a belt conveyor, advancing a bottle 27 to be counted, whereby the bottle is registered by the optical device 4, 5 and leaves the end of the transporting means by means of the ejector mechanism 7. The light source 5 generates and transmits parallel light towards the photo-electric sensing unit 4 where the shadow image of the bottle is registered and the transition between light and shadow is detected by the photo-cells 26.

The output signals from the sensing unit 4 are applied to the electronic control unit 1 where the signals are processed and classified. The control unit 1 operates a printer 2 which, on command from the control panel 3, provides a printout showing the number of registered bottles and their total value. The command of the apparatus is initiated by the start device 14 and stop (receipt) device 15, these devices being connected to the main control 8.

Figure 2:
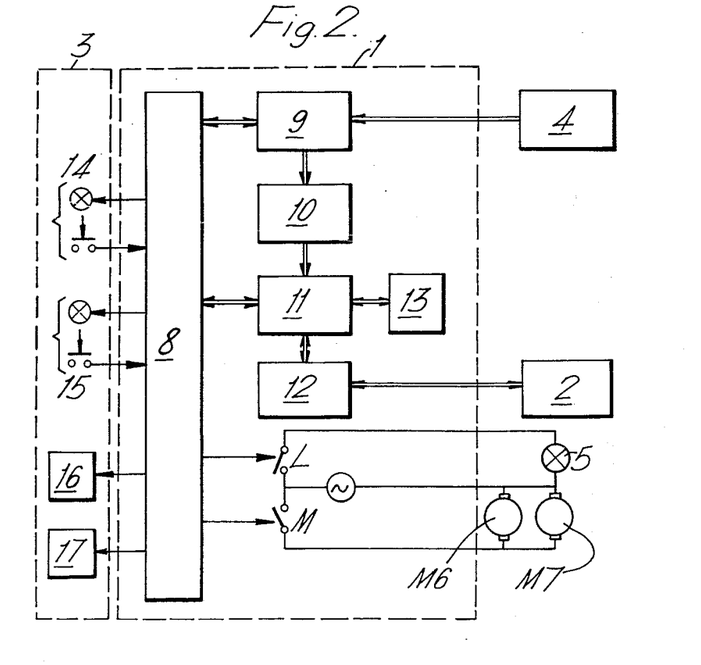
FIG. 2 is a block diagram of the electronic central unit with control unit and associated arrangements.
Figure 3:
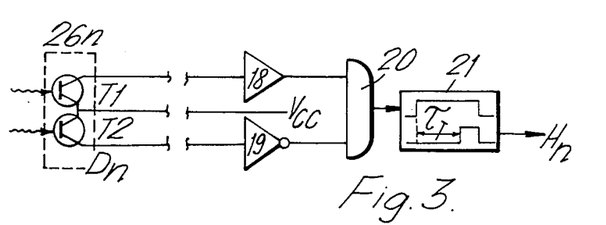
FIG. 3 is a block diagram of the signal converter.

As seen in FIG. 2, the signals from the sensing unit 4 are applied to a signal converter 9 which is connected to a control unit 8. The signal convertor 9 consists essentially of two amplifiers 18, 19 a logic gate circuit 20 and a time delay device 21 with variable time delay $\tau$, as seen in FIG. 3.

The output signal of converter 9 is further processed in the detector logic 10 (block 22 of FIG. 5) and transferred to the computer and registration unit 11. This unit is programmed by the programming panel 13, said panel enabling the bottles to be assigned to different values. The unit 11 is connected to the control circuit 8 and the printer 2 via the printer control circuit 12. The counters 16, 17, which provide the total registration of bottle types, are connected to the control and registration unit 11. The light source 5 is supplied with electric power via the switch L, said switch being controlled by the control circuit 8. The driving motors M6 and M7 for providing power to the transporting means 6 and the ejector mechanism 7, respectively, are supplied with electric power via the switch M, said switch also being controlled by the control circuit 8.

The optical sensing unit 4 consists of a plurality n of photo-electric sensing device 26. The sensing device 26, only one of which is shown in FIG. 3, consists of two photo-transistors T1 and T2 (e.g. TEXAS LS 602 or the like). Each photo-transistor 26 is, as previously mentioned, connected to a separate signal converter 9 of the above mentioned kind. When transistor T1 receives light and the light to transistor T2 is blocked by a bottle, then, and only then, will the output Hn of delay circuit 21 attain the value 1 after a time delay. The adjustable time delay 21 offers the possibility of filtering out light/shadow transitions of undesirable short duration. For registration to be possible, continuous light must have been present on the lower transistor T2 at least for the time interval $\tau$. The delay 21 is adjusted such that $\tau$ is of a somewhat shorter duration than the passing-time for the shadow 28 of the top of the bottle. In the example shown in FIG. 7, this shadow passes the detector 26-3. The "background noise" is in this way efficiently filtered out, and only light-shadow transitions of longer duration than $\tau$ will be registered, i.e., only bottles having the determined heights will be registered. The sensing unit 4 is shown in FIG. 7 as having seven photo-cells, 26n, but it is obvious that there may be less or more, depending on the requirements of the apparatus in the registration of different types of bottles. The photo-cell 26a measures the intensity of the light from the light source 5 at a position which is not passed by a bottle. The control unit 8 will, if the intensity of light detected by photo-cell 26a is too low, ensure by means of the converter 9 that the switch M opens and that the power supply to the motors M6 and M7 is switched off, so that further transport of bottles is not possible.

The pattern recognition in accordance with the invention involves measuring the height of the different objects, which means that only one photo-cell detector is necessary for each type of the bottles.

Figure 5:
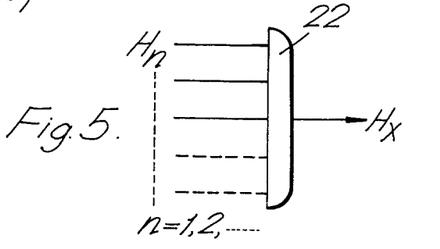
FIG. 5 is a block diagram of the detector logic.

The apparatus is, however, designed for more complicated registration of dimensions, such as the height of the bottles, by employing two or more detectors for each registration. This enables an increase in the registration accuracy. For example, as illustrated in block 9 of FIG. 8, it is apparent that the use of additional inputs and additional photo-transistors increases the registration accuracy. Further, as illustrated in FIG. 5, each bottle type is assigned a predetermined output signal $H_1$ ... $H_n$. All of these signals are applied to the OR gate 22, which provides the output signal $H_x$.

Figure 4:
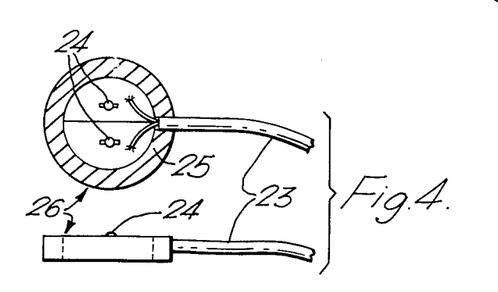
FIG. 4 is a simplified illustration of a photo-cell that may be employed on the apparatus of the invention.

FIG. 4 shows a photo-cell consisting of two photo-transistors 24 with a supply cable 23. In a preferred embodiment of the invention, the photo-cell is surrounded by a ring-shaped magnet 25 which is fixed to the photo-cell by means of epoxy, so that the photo-cell may easily be fixed in a simple manner to a metal plate in the apparatus, thus enabling simple trimming and adjustment of the sensing unit 4.

Figure 6:
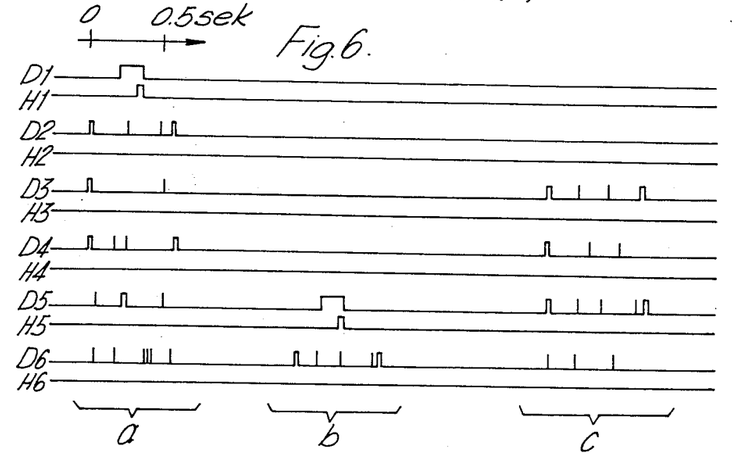
FIG. 6 shows an example of a signal diagram.

A signal diagram is shown in FIG. 6 illustrating the signals Dn, Hn for some types of empties, wherein Dn corresponds to the output of the nth photo-detector and $H_n$ corresponds to the output of the nth delay circuit. A $a$, the registration of one type of bottles occurs at the uppermost detector 26-5. The third bottle, at $c$, is not registered because it is "unsaleable" and has a height lying between the detectors 26-2 and 26-3. In the particular example (FIGS. 6 and 7), 26-1 is the uppermost and 26-6 the lowermost detector. The pulses which are generated by the lower detectors are due to the light/shadow transitions from the bottleneck which passes the lower detectors, as well as undesirable refraction in the bottle glass, if the said glass is limpid. In addition, the shadow image 28 and the bottle feed-in opening 29 are illustrated in FIG. 7.

The printer 2 may be of a recognized type, e.g., "SODECO-decaprint type PN213" or the like.

With regard to the operation of the apparatus above described, according to the invention, the customer may start the registration by depressing the start-device 14. When ready, the apparatus will turn on a light in the said device, as well as turn on the light source 5. The transporting means 6 and the ejector mechanism 7 are started once the light intensity has reached a sufficient level, and the customer may put his bottles on the transporting means 6. When all the bottles to be counted have passed through the opening in the front panel, the customer depresses the stop or receipt device 15, the apparatus acknowledging by turning on a light in the said device. A receipt slip is then printed by the printer 2 after a short time interval, e.g., 2 seconds. The apparatus thereafter independently turns off all the lights and disconnects, i.e., stops, the driving motors. The "tear-off" slip may give information about the total number of registered bottles and the outstanding sum of deposits.

Figure 8:
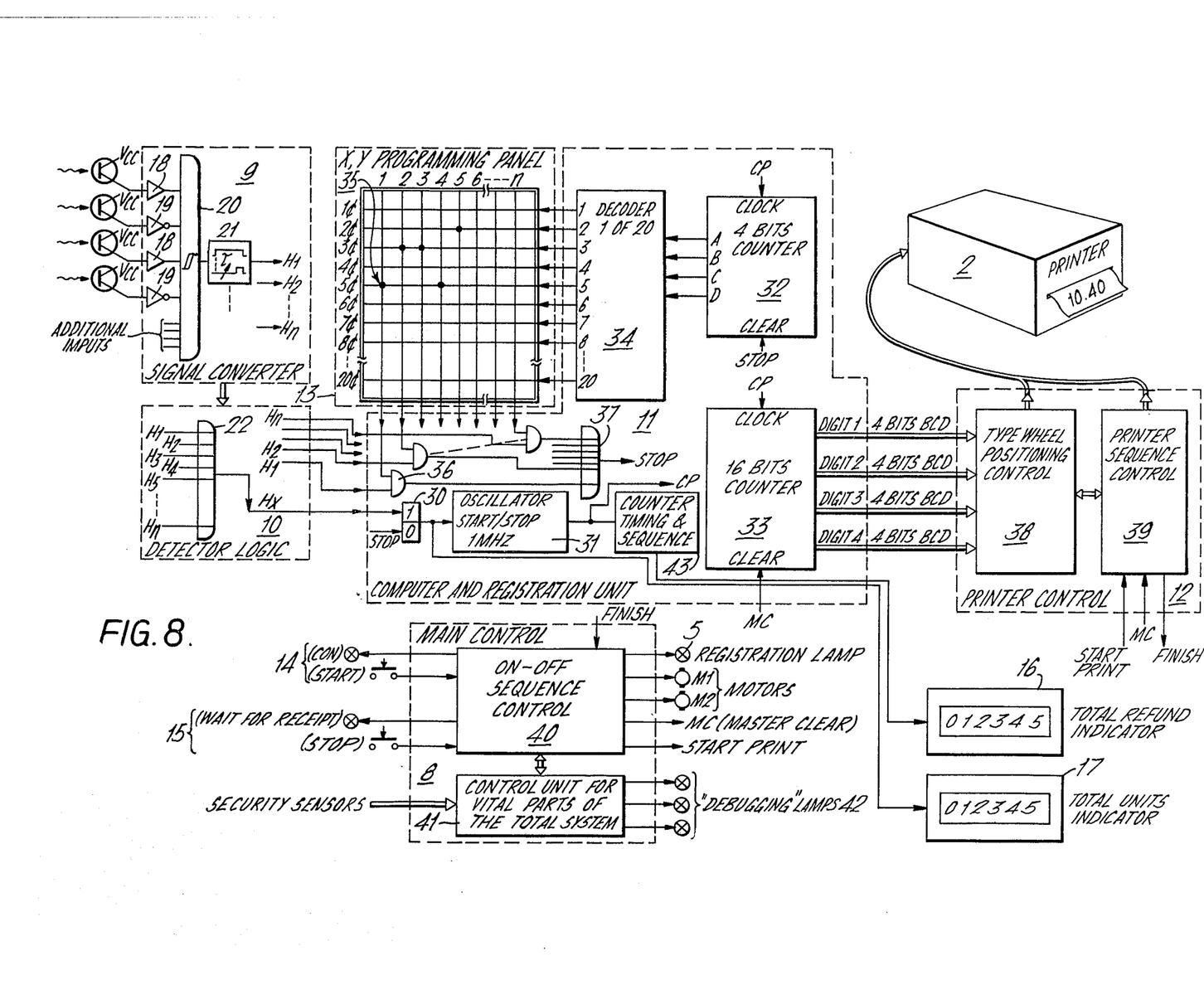

FIG. 8 illustrates in greater detail a preferred embodiment of a pattern recognition and registration apparatus in accordance with the invention. In this circuit, the signal convertor 9 is illustrated as comprised of a logic gate circuit 20 and a time delay device 21, the delay device having a variable time delay. The logic gate circuit 20 is provided with a plurality of inputs connected to separate amplifiers 18 and 19. Thus, in the illustrated arrangement, four photo-transistors are illustrated, the output of two of the photo-transistors being connected to separate amplifiers 18, and the output of the remaining two photo-transistors being connected to separate amplifiers 19. The signal converter is arranged to produce an output if, and only if, a coincidence occurs between an input at one of the amplifiers 18 and an input at the corresponding amplifier 19 following the set delay time. The delay ensures that the output H corresponds to the detection of a desired transition between light and shadow, so that spurious responses do not occur, as above discussed. The time delay is variable, in order to be able to control the output response of the converter. For example, the signal converter in its simplest form may be comprised of a time delay circuit for delaying the output of an amplifier 19, followed by a comparator for comparing the output of the delay circuit with the output of the corresponding amplifier 18. Each characteristic to be recognized, for example, each bottle height to be recognized, is assigned a separate output identification $H_n$. Each of the characteristics may be the result of a single comparison as above discussed or of a multiple comparison, i.e., the comparison of the outputs of more than two photo-cells. The signal converter includes a similar comparison arrangement for producing the other output characteristic signals $H_2 - H_n$, so that any number of sizes and/or shapes of bottles may be recognized and registered.

The outputs $H_1 - H_n$ of the signal converter are applied to an OR gate 22 of the detector logic circuit 10, this circuit providing an output $H_x$ whenever a comparison is detected.

The output $H_x$ of the detector logic circuit 10 is applied to the setting terminal of a flip-flop 30 in the computer and registration unit 11. The setting of the flip-flop 30 enables a start-stop oscillator 31, for example, having a frequency of 1 megahertz, the oscillator 31 producing a clock pulse output at this frequency as long as the flip-flop circuit has been set.

The clock pulse outputs of the oscillator 31 are applied to a four bit counter 32 and also to a 16 bit counter 33. The outputs of the four bit counter 32 are applied as inputs to a 1-out-of-20 decoder 34. Consequently, outputs occur sequentially on the outputs of the decoder 34. For example, as illustrated in FIG. 8, the decoder 34 may have 20 outputs. The number of outputs selected for this decoder is determined by a number of possible values that may be assigned to bottles. The outputs of the decoder 20 are applied to separate rows of a programming matrix in the programming panel 13. The outputs $H_1 - H_n$ of the signal converter, which may be applied by way of the detector logic circuit 10 as illustrated in FIG. 8, are applied as one input to a corresponding number of separate AND gates 36. The other input of each of the AND gates 36 is connected to a separate column line of the matrix in the programming panel. The programming panel is programmed by selectively providing interconnections between selected row and column lines. The interconnections may be provided by conventional means, such as by switches or connecting plugs. The row lines of the matrix may, as illustrated in FIG. 8, correspond to different values of 1 cent through 20 cents. Each column line is preferably connected to only a single row line, since a given bottle is assigned only a single value. Since different bottle sizes may have the same value, however, each row line may correspond to more than one column line.

When an output of the coder on a given row line corresponds to a value to which a bottle has been assigned, a pulse appears on the corresponding column line, such pulse being applied to the corresponding AND gate 36. The outputs of the AND gates 36 are connected to an OR gate 37. The output of the OR gate 37 is a stop pulse, which is connected to the flip-flop 30, and to the clear terminal of the counter 32. This results in the resetting of the flip-flop 30 to stop the oscillator 31, as well as the clearing of the four bit counter 32. During this counting sequence, a count will have been introduced into the 16 bit counter 33 corresponding to the value of the registered bottle.

For example, if a given bottle type corresponding to signal $H_1$ is being registered, after five pulses from the oscillator 31 a pulse will appear on the fifth row line of the matrix of the programming panel. A code pin 35 is provided shorting the fifth row line with the line corresponding to a given bottle type, and consequently the fifth pulse from the oscillator will result in an output from the AND gate 36, and a stop pulse output from the OR gate 37. As a consequence, the oscillator 31 is stopped after the fifth pulse, and the four bit counter 32 is cleared. The five pulses of this counter have been registered in the counter 33. The output of the oscillator may also be applied by way of a counter timing and sequence setter 43 to the total refund indicator 16, for indicating the total value of refunds from the circuit. Further, since the flip-flop circuit 30 is operated once during each count of a bottle, the output of this circuit may be applied to the total index indicator 17 for indicating the total number of bottles registered by the apparatus.

It will be apparent that the matrix of the programming panel 13 may be programmed in any desired manner, so that each bottle type may be assigned the desired value, and the value for each bottle type may be changed if desired.

The printer control circuit 12 consists of a type wheel positioning control 38 and a sequence printer control 39. The printer control 12 acts on the interface between the computer and registration unit 11 and the printer 2. When making a print out from the printer 2, an output is applied from the memory of counter 33 to the type wheel positioning control 38. The on-off sequence control 40 in the main control circuit 8 initiates the start print-signal once the stop button 15 has been depressed. The printing operation will thus commence, and after its termination a finish signal will be transferred from a printer control 12 to the main control circuit 8. This signal results in the generation of a master clear signal from the control circuit 40 to the counter 33 and the printer control 12 before the entire apparatus is switched off. The master clear signal, which insures the resetting of the counter 33 and the control unit 12 as well as the printer 2, is emitted from the main control circuit 8 both when the apparatus is started and when it is stopped.

In other words, the total number of clock pulses which occur between the start and stop of the apparatus under control of an operator, are registered in the 16 bit counter 33. This count, corresponding to the total value of the bottles the operator desires to have counted, is transferred to control the type wheel positioning and control circuit 38. The printing of this value does not occur, however, until a start printing signal is received from the sequence control circuit 40. The start printing signal is responsive to the depressing of the stop button by the operator. After the sequence control circuit 39 has effected the printing of the bottle values in the printer 2, it generates a finish signal which is applied to the sequence control circuit 40. In response to this signal, the sequence control 40 generates a master clear signal for clearing the counter 33 and the printing circuits.

The main control circuit 8 is also provided with a control unit 41 which is coupled to safety sensors in the apparatus. The control unit 41 is provided with indicators 42 for indicating the type of fault which may occur in the system. Such warning indications may, for example, be required to signal light emission failure, required paper loading in the printer or current overload.

While the counters in the circuit of FIG. 8 have been indicated to have certain bit storage capacities, it will be evident that the types of counters employed may be adapted to the outputs and the amount of data required for the system.

In the merchandising of bottles, it is conventional to provide bottles in cartons of, for example, six or eight. The above described apparatus is adaptable for the recognition and registration of individual bottles, and it is hence, also desirable to provide means for recognizing and registering the individual bottles in a carton, without the necessity for a customer to remove the bottles from the carton. For this purpose, an apparatus in accordance with the invention may incorporate another conveyor system and a detecting system for recognition of the bottles in a carton, it being advantageous of course, that the electronic components of the system be usable in common with the individual bottle and carton registration systems. FIGS. 9–12 illustrate the system in accordance with the invention, in which a separate conveyor and photo-cell registration system is employed for the detection of individual bottles in a carton, the system being adaptable with slight modification to the use of the circuit FIG. 8, whereby individual bottles and the bottles and cartons can be registered by the same controlling registration system. It will, of course, be apparent that, with suitable modification, the conveyor system for cartons may be combined with the conveyor system for individual bottles.

Figure 10:
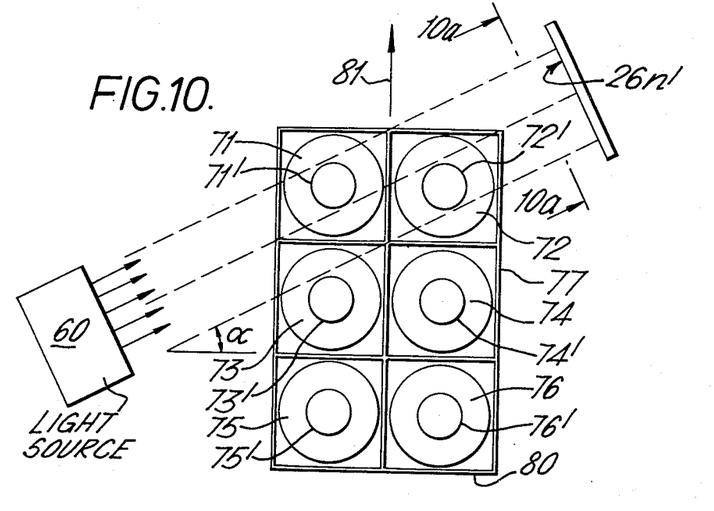
FIG. 10 is a simplified sketch of the relative location of the light source and sensors in the detection of bottles in a carton, in accordance with the invention.

Referring now to FIG. 10, diagram is illustrated the top view of bottles 71–76, arranged side by side in pairs as they are normally packed in a carton 80. The tops of the bottles are indicated by the reference numerals 71'–76', and the direction of movement of the carton 80 on a conveyor belt in the registration system in accordance with the invention is shown by the arrow 81. It is apparent that, if a light source is directed normal to the direction of movement 81, it will not be possible to detect all of the bottles in the carton, since the bottles in one column will be behind the bottles of the other column with respect to the light source. Therefore, in accordance with the invention, a light source 60 is provided for directing parallel light at an angle to the direction 81 of movement of the carton, the light from the source 60 being directed on the detector unit 26m' arranged normal to the path of the light. As illustrated in FIG. 10, it is thus apparent that shadows of each of the bottles will appear on the detector unit 26m'. In a preferred embodiment of the invention, the angle is approximately 20°. The light source 60 is preferably a halogen lamp, with the light being directed to the bottle tops 71'–76'.

Figure 10A:
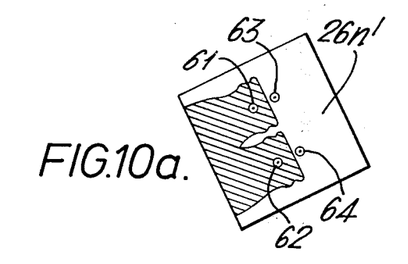
FIG. 10a is a side view of the detector units illustrated in FIG. 10, taken along the line 10a—10a of FIG. 10.

A portion of the side view of the photo-detector unit 26m' is illustrated in FIG. 10a, wherein a pair of photo-detectors 61, 63 and a pair of photo-detectors 62, 64 are illustrated, with respect to the shadow images of the tops of the two bottles 71 and 72, respectively. Thus, the two photo-detectors 61 and 62, which may be photo-transistors, are in the shades of the bottles 71, 72, respectively, and the other two detectors 63, 64 are exposed to the light beam. Hence, the photo-detectors 61–64 provide a normal registration of the existence of the two bottles 71 and 72 of the correct height, and the existence of these two bottles of the correct height can be memorized, as will be described in greater detail in the following paragraphs. If one of the bottles 71–72 is missing, or if other abnormal conditions are present, such as the presence of an odd-sized bottle in the carton, the existence of a foreign body, or if the carton is in bad condition, an unsymmetric shadow image will appear on the detector unit 26m', and consequently, the normal image illustrated in FIG. 10a will not appear on the detector unit. It will be apparent, of course, that additional photo-cell pairs may be provided on the detector unit 26m' for the detection of bottles of different sizes.

Figure 9:
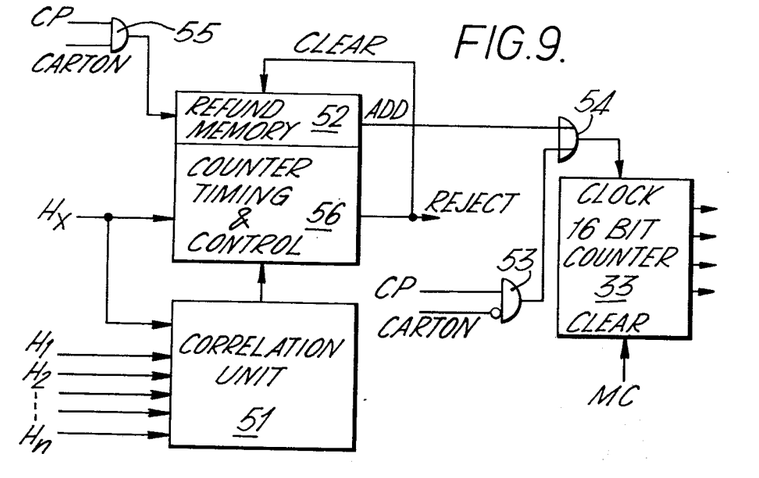
FIG. 9 is a block diagram of a modification of a portion of the apparatus of FIG. 8, adapted for the recognition and registration of bottles in a carton.

Referring now to FIG. 9, therein is illustrated a modification of a portion of the circuit of FIG. 8, to adapt the detector-logic, computer and registration unit and program panel for the registration of bottles in a carton, the modification also enabling the use of these units in the registration of individual bottles. In this arrangement, the clock pulses, instead of being applied directly to the clock input of the 16 digit counter 33, applied by way of a direct input of AND gate 53 and one input of OR gate 54 to the clock input of the counter 33. A signal indicating the existence of a carton to be registered is applied to an inverting input of the AND gate 53. As a consequence, the clock pulses will be applied by way of the gates 53 and 54 to the counter 33 only if there is no signal indicating the presence of a carton to be registered, this being the condition when an individual bottle is to be registered.

In the arrangement of FIG. 9, the clock pulses and the signals indicating the presence of a carton are applied to the inputs of an AND gate 55, the output of the gate 55 being applied to a refund memory circuit 52. The "add" output of the memory 52 is applied by way of the OR gate 54 to the clock input of the counter 33, to enable the storing of pulses in the counter 33 corresponding to the pulses stored in the memory 52 upon the correct registration of all bottles in a carton, under the control of a counter timing and control circuit 56. The output $H_x$ of the detector-logic circuit similar to the dectector-logic circuit 10 of FIG. 8, is applied to the counter timing and control circuit 56, and to a correlation unit 51. The signal $H_x$ is in this case derived from a signal converter adapted for detecting of the bottles in a carton, as will be described in greater detail with reference to FIG. 11. The outputs $H_1$–$H_m$ derived from the signal converter of FIG. 11 are also applied to the correlation unit 51.

Figure 11:
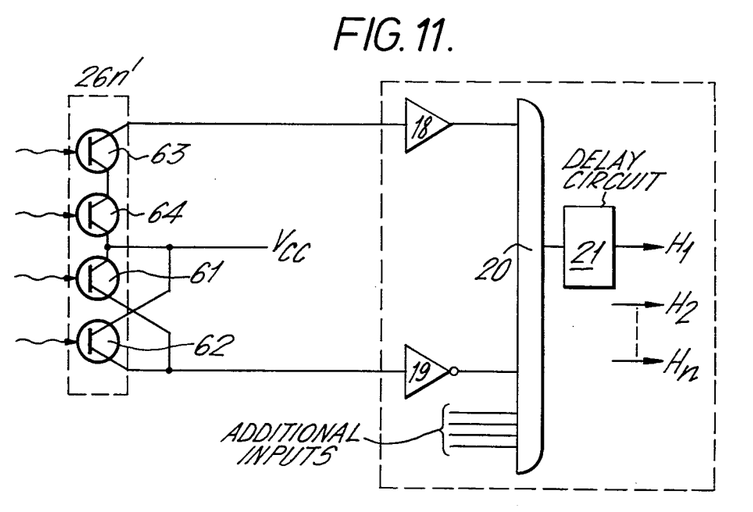
FIG. 11 is a simplified circuit diagram of a signal convertor unit in accordance with the invention, for detecting bottles in a carton.

As illustrated in FIG. 11, a detector unit $26m'$ for detecting the bottles of given physical characteristics includes the photo-cells 61–64, such as photo-transistors, as provided in the detector unit $26m'$ of FIG. 10a. The photo-detectors 63 and 64 are serially connected with one amplifier 18, and the photo-detectors 61 and 62 are connected in parallel to the input of the inverter 19. It will thus be apparent that a delayed output $H_1$ will be provided in the circuit of FIG. 11 only if a shadow of two spearate bottles shows on the photo-detectors 61 and 62 and no shadow is presented to the photo-detectors 63 and 64, i.e., the normal registration of a pair of bottles. As in the arrangement of FIG. 8, additional inputs for detecting other characteristics may be applied to the logic gate circuit 20. In addition, further similar units may be provided to enable the generation of outputs $H_2$–$H_m$ corresponding to other sizes or physical characteristics of bottles. As in the arrangement of FIG. 8, the signal $H_x$ is derived from the output of a suitable OR gate, to which all of the signals $H_1$–$H_m$ are applied.

The operation of the arrangement of FIG. 9 is based upon the principal of registration of height of the bottles, and the prevention of registration of the bottles if bottles of uneven height are present in the carton, or if the carton is not full. The correlation unit 51 memorizes the detected heights of the bottles first detected in the carton, and correlates this measurement with the measurement from each following pair of bottles detected in the carton. If the carton is full and all pairs of bottles are registered, the correlation unit 51 provides an output to the control circuit 56, which enables the contents of the memory 52 to be read out to the counter 53, thereby enabling the registration of the value of the bottles in the counter 33. If, on the other hand, the required conditions as above stated are not met, the carton with its bottles will be returned to the customer by way of a suitable aperture in the apparatus, and the accumulated refund value in the refund memory 52 is cleared by means of the reject of the control circuit 56. In other words, if the pairs of bottles detected do not correspond to a correctly filled carton, the correlation unit 51 will signal the control unit 56 to provide a "reject" output, the reject output being employed to effect the return of the carton, and to clear the memory 52.

The correlation unit 51 thus may be comprised of a storage unit for storing the signals $H_1$–$H_m$ and comparing the signals with subsequently received inputs, to provide an output to the control unit to permit the emptying of the contents of the memory 52 if a correct correlation is obtained, and to signal the generation of the "reject" signal if a correct correlation is not obtained. The control unit 56 may include timing means responsive to the first signal $H_x$, to enable the control function to be operative over a determined period, for example, depending on the speed of the conveyor system, so that all of the bottles in a carton of normal size may be registered and correlated, this unit also providing a read-out signal to the memory 52 after the predetermined time if no indication of an incorrectly filled carton is received from the correlation unit 51.

It is thus apparent that, if a "carton" signal is not received in the apparatus, single bottles may be registered by way of the clock pulses applied to the counter 33 by way of the gates 53 and 54, and if a "carton" signal is received, the clock pulses are first stored in the memory 52, and then supplied to the counter 33 by way of the gate 54 if a correctly filled carton has been detected. It is thus apparent that, in the absence of the occurrence of a "carton" signal, the apparatus of FIG. 8, modified in accordance with FIG. 9, will operate in the previously described manner for the registering of individual bottles.

Figure 12:
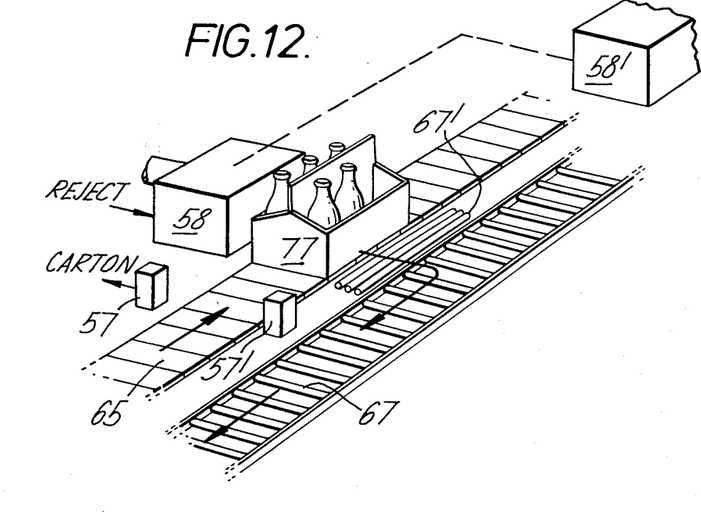
FIG. 12 is a simplified illustration of means for rejecting cartons, in accordance with the invention.

FIG. 12 illustrates, in simplified form, a conveyor system for use in the detection and registration of cartons. In this arrangement, the cartons 77 of bottles are placed on a conveyor 65 by a customer, the presence of a carton being indicated by conventional photo-detector 57 aligned with a light source $57'$. The "carton" signal above discussed with reference to FIG. 9, thus may be derived from the photo-detector 57. The conveyor belt 65 may be operated in the same manner, and be similar to the belt 6 employed in the detection and registration of individual bottles, for example as illustrated in FIGS. 1 and 7. In the event that an incorrectly filled carton is detected, suitable means are provided for returning the carton to the customer. For this purpose, a rack 67, for example, comprised of a row of parallel rollers, may be provided adjacent the conveyor 65, with suitable additional rollers $67'$ extending normal to and between the conveyor 65 and rollers 67. A reject device 58, such as an electrically or hydraulically operated ram, is provided to urge the cartons 77 from the conveyor 65 to the rollers 67 upon receipt of a "reject" signal. Similarly, in order to provide motive force for the returning of cartons to the customer, a ram $58'$, mechanically coupled to the device 58, urges the cartons on the rollers 67 back to the customer through a suitable (not shown) aperture in the apparatus. It will be apparent, of course, that alternative arrangements may be provided for the return of the cartons to a customer upon the detection of an incorrectly filled carton.

Figure 13:
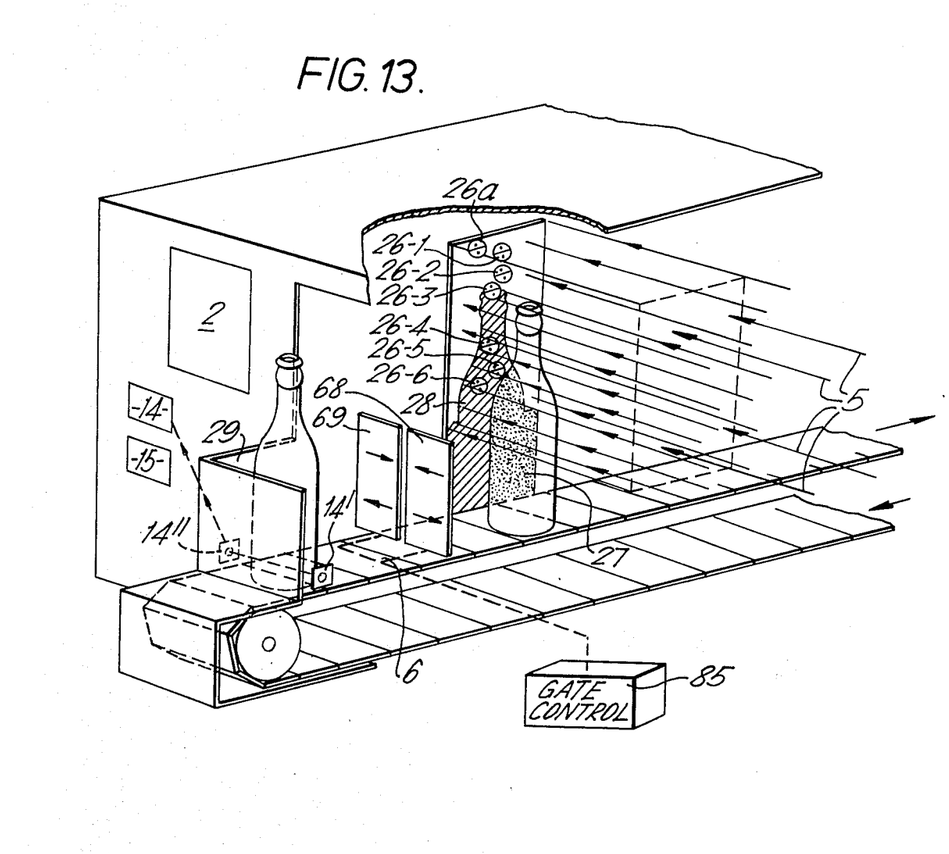
FIG. 13 is a modification of the arrangement of FIG. 7, illustrating means for detecting and spacing bottles on the conveyor belt.

Referring now to FIG. 13, which illustrates a modification of the arrangement of FIG. 7, a suitable light source $14'$ may be provided to direct light, such as infra red light, on a photo-detector $14''$, in the single bottle registration system, in order to provide a signal indicating the placement of a single bottle on the conveyor 6. The photo-detector $14''$ thus may be provided alternatively to the switch 14, for the generation of the "start" signal for the apparatus. FIG. 13 also illustrates the provision of a pair of vertical plates 68 and 69 movable transversely of the belt 6. When two bottles are placed too close on the conveyor 6, a problem arises in the registration of the bottles, an additional problem may arise in the ejecting of the bottles from the belt if they are two closely spaced, for example, if a vertical transport system is employed. The barriers 68 and 69 are mechanically coupled to a barrier control system 85, so that upon the movement of one bottle into the detection region, the gates are moved together to block further movement of bottles later placed on the belt, until an adequate space has been obtained between adjacent bottles on the belt. The barrier control device 85, which may hydraulically or electrically be operated, thus may comprise a timing device energized, for example, by the start 14 or the output of the photo-detector $14''$, to close the barriers 68 and 69 after the bottle has passed the barriers, and to hold them closed for any determined period to prevent further entry of bottles into the detection region. If desired, alternatively, other means may be provided for controlling the initiation of operation of the barrier control circuit 85, such as the provision of suitable detecting means for detecting bottles entering the detecting region.

If desired, further means may be provided for urging individual cartons or individual bottles on their respective conveyors as close as possible to their respective photo-detector units, in order to insure the provision of as sharp a shadow image of the bottles on the photo-detector units as possible. Such means may be energized by any suitable control, for example, upon the provision of a "start" signal in the apparatus.

Figure 14:
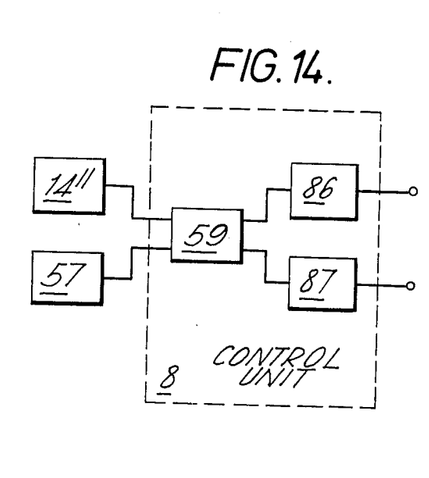
FIG. 14 is a simplified block diagram of means for controlling the operation of single bottle or carton units in accordance with the invention.

The photo-detector units 26m' in the carton registering part of the apparatus may be multiplexed in turn with the corresponding units 26m in the single bottle registration part of the apparatus. As discussed above, the signal conversion, detector-logic and computer and registration unit and program panel may be in common in both systems. The detector units 26m' and 26m will thus register where the first detection of a bottle takes place. The system may be thus time multiplexed so that the registration is effected in the unit in which the first detection occurs. Thus, as illustrated in FIG. 14, the output of the single bottle detecting device 14'', and the output of the "carton" detecting device 57 may be applied to a logic circuit 59, which may be conveniently provided in the control unit 8, so that the motor control device 86 for controlling the single bottle conveyor 6 is energized to the exclusion of the conveyor 67, in the event that a single bottle is first detected and, alternatively, to energize a control circuit 87 for controlling the conveyor 67 to the exclusion of the belt 6 if a "carton" signal is first received.

If the cartons are worn, for example, are torn or have dents or foreign bodies are present in the carton, this will, of course, result in the bottles, even though having the same height, standing unsymmetrically in their respective cartons. This non-symmetry is registered by the photo-electric detector 26m' resulting in a "reject" signal and the consequent return of the carton. The bottles may now, if desired, be registered by a customer as single bottles by taking them out of the carton and feeding them into the portion of the machine for registering single bottles.

Although the apparatus is shown in embodiments intended for use in grocery stores, it is obvious that it may find application in the registration and classification of other objects than empties and not necessarily in grocery stores.

What is claimed is:

1. In an apparatus for the automatic pattern recognition of empty bottles by the use of shadow images of the bottles to detect the respective characteristic dimensions of each type of bottle, of the type having an optical device including a light source positioned to direct light to a photo-electric sensing unit, and transport means for transporting bottles across the path of said light; the improvement wherein said sensing unit comprises a plurality of photo-electric sensing devices positioned to detect the occurrence of determined characteristics of a bottle passing across said path of light, said apparatus further comprising a registration device, said registration device comprising programming means for assigning different values to data corresponding to different bottle characteristics, means applying the output of said sensing unit to said registration device for registering therein the number of each type of bottles that pass through said path of light, said means applying the output of said sensing unit to said registration device comprising logic circuit means for passing data corresponding to pre-determined characteristics of bottles, printing means, and control unit means responsive to data registered in said registration device and connected to operate said printing means for printing said data.

2. The apparatus of claim 1, wherein said means applying the output of said sensing unit to said registration device comprises signal converting and detecting means for logically sorting data from said sensing unit, whereby only data corresponding to predetermined characteristics of bottles are added and stored in said registration device and data without said predetermined characteristics are rejected, and wherein said control unit means comprises printer control means.

3. The apparatus of claim 1, wherein said sensing unit comprises photo-cell detectors, and means for adjustably mountly said photo-cell detectors, whereby said sensing units may be positioned to enable the registration of bottles of any determined dimensional characteristics.

4. The apparatus of claim 1, further comprising ejector means, said ejector means being positioned to eject bottles from said transport means, and comprising two rollers of elastic material having opposed frictional surfaces, said rollers being positioned to turn about their respective vertical axes at a determined minimum distance from each other, and means for rotating said rollers with most adjacent regions of the opposed surfaces moving in the direction of movement of said transport means.

5. The apparatus of claim 4, wherein said means for rotating said rollers comprises a separate driving motor for rotating each of said rollers.

6. The apparatus of claim 1, further comprising a control panel having start and stop control means for controlling said apparatus, counter means for the registration of different types of bottles, said control means being connected to control said counter means.

7. The apparatus of claim 1 wherein said light source is positioned to direct parallel light to said photo-electric sensing unit at an angle between 0° and 90° to the direction of movement of said transport means.

8. The apparatus of claim 7 for detecting bottles in a carton on said transport means, wherein a pair of photo-electric sensing units are positioned to simultaneously be in the shadows of different bottles of a pair of bottles arranged in a row transversely of said belt.

9. The apparatus of claim 8 wherein said registration device further comprises means for comparing sequential outputs of the sensing unit, and means for registering data in said registration device only upon the sensing of a determined relationship between the sequential outputs of said sensing units.

10. In an apparatus for the automatic pattern recognition and registration of empty bottles of the type having an optical device including a light source positioned to direct light to a plurality of photo-electric sensing units, and a transport means for transporting bottles through the path of said light; the improvement comprising a computer and registration unit, means applying the outputs of said sensing units to said computer and registration unit, a programming unit, said computer and registration unit comprising means responsive to the application of signals thereto for producing first signals corresponding to different values of said empty bottles, means for applying said first signals to said programming unit, said programming unit comprising comparing means connected to compare the outputs of said sensing units with said first sigals for providing a second signal corresponding to a comparison of the outputs of said sensing units with first signals corresponding to the respective values assigned to empty bottles, means responsive to said second signal for stopping operation of said computer and registration unit, said computer and registration unit comprising storage means responsive to said second signal for storing a value corresponding to the first signal which, when compared with the outputs of said sensing units, resulted in the occurrence of said second signal, printing means and means for controlling said printing means in response to the output of said storage means.

11. The apparatus of claim 10, wherein said computer and registration unit comprises an oscillator, means responsive to the outputs of said sensing units for starting said oscillator, means responsive to said second signal for stopping said oscillator, first counter means connected to the output of said oscillator, decoding means connected to the outputs of said first counter means, and a second counter connected to the output of said oscillator, said programming unit comprising a matrix having row lines connected to the outputs of said decoding means, and column lines selectively connected to row lines, said computer and registration unit further comprising a plurality of AND gate means having first inputs connected to separate column lines and second inputs connected to receive the outputs of separate sensing units, OR gate means connected to the outputs of said AND gate means, and means responsive to the output of said OR gate means for stopping said first counter and said oscillator, said second counter comprising said storage means.

12. In the apparatus of claim 11, further comprising a sequence control means, means responsive to energization of sequence control means for energizing said transport means, means responsive to the deenergization of said sequence control means for producing a start print signal, said printing control means comprising means responsive to the output of said second counter and said start print signal for controlling printing in said printing means, and means producing a finish signal in response to a printing operation in said printing means, said sequence control means further comprising means responsive to said finish signal for producing a clear signal, means applying said clear signal to said second counter for clearing said second counter, and means applying said clear signal to said printing control means for clearing said printing control means.

13. The computer and registration unit of claim 12, further comprising security sensing means for detecting faults in said apparatus, and means responsive to the outputs of said security sensing means for stopping said sequence control means.

14. The apparatus of claim 11, further comprising a total refund indicator connected to the output of said oscillator.

15. The apparatus of claim 11, further comprising a total units indicator, said computer and registration unit comprising a flip-flop, means responsive to the outputs of said OR gate for resetting said flip-flop, means applying the output of said flip-flop to control the operation of said oscillator and to said total indicator for providing an indication thereon of a number of said bottles registered in said apparatus.

16. The apparatus of claim 10, wherein said programming unit comprises a matrix having a plurality of row lines corresponding to different values of bottles, a plurality of column lines corresponding to bottles of different characteristics, and means for selectively interconnecting row and column lines.

17. The apparatus of claim 10 wherein said light source is positioned to direct parallel light to said photo-electric sensing units at an acute angle to the path of movement of said transport means.

18. An apparatus according to claim 10 for the automatic pattern recognition and registration of empty bottles in a carton of the type having a pair of bottles arranged transversely of the direction of movement of said transport means, wherein said light source is positioned to direct parallel light to said photo-electric sensing units at an acute angle to the path of movement of said transport means, and said photo-electric sensing unit comprises a pair of photo-sensitive devices positioned to simultaneously be in the shadows of different bottles of a pair of bottles arranged in a row transversely of said path, and further comprising means for providing an output from said photo-electric sensing unit only upon the simultaneous detection of shadow images by each photo-detection device.

19. The apparatus of claim 18 further comprising means for comparing sequential outputs of said photo-electric sensing unit, and means for registering data in said registration unit only upon the detection of a predetermined relationship between sequential outputs of said sensing unit.

20. The apparatus of claim 19, wherein said registration unit comprises means for temporarily storing data corresponding to values of empty bottles, and means responsive to a determined relationship between sequential outputs of said sensing unit for storing the output of said temporary storage means in said first mentioned storage means.

* * * * *